United States Patent [19]

Inamoto

[11] 4,285,103
[45] Aug. 25, 1981

[54] ELEMENT MOUNTING STRUCTURE

[75] Inventor: Hiroshi Inamoto, Yokohama, Japan

[73] Assignees: Kato Hatsujo Kaisha, Ltd.; Nissan Motor Co., Ltd., both of Yokohama, Japan

[21] Appl. No.: 112,282

[22] Filed: Jan. 15, 1980

[30] Foreign Application Priority Data

Jan. 17, 1979 [JP] Japan .................................. 54-2911

[51] Int. Cl.³ ........................ F16L 33/12; F16B 19/00
[52] U.S. Cl. ................................. 411/508; 24/221 A; 24/293; 24/297; 411/15; 411/349
[58] Field of Search ............. 24/73 P, 73 PF, 73 PM, 24/73 PP, 73 SC, 221 R, 221 A; 85/5 P

[56] References Cited

U.S. PATENT DOCUMENTS

| 3,130,822 | 4/1964 | Meyer | 24/73PM |
|---|---|---|---|
| 3,246,375 | 4/1966 | Landwer | 24/73 PM |
| 3,335,471 | 8/1967 | Seckerson et al. | 24/221 R |
| 3,422,500 | 1/1969 | Munse | 24/73 PM |
| 3,443,783 | 5/1969 | Fisher | 24/221 R |
| 3,694,864 | 10/1972 | Kawano | 24/73 PF |

FOREIGN PATENT DOCUMENTS

| 1171405 | 11/1969 | United Kingdom | 24/73 PP |
|---|---|---|---|
| 741059 | 8/1966 | Canada | 24/73 PM |

Primary Examiner—Victor N. Sakran
Attorney, Agent, or Firm—Silverman, Cass & Singer, Ltd.

[57] ABSTRACT

The disclosed structure is for mounting an element to a body, comprising a through hole bored on one of the body and element, a mounting hole bored on the remaining one thereof, and a unitary clip detachably engaging said through and mounting holes, said clip having a holding portion engageable in said through hole, and said through hole having a guide means for twisting said holding portion as the holding portion is inserted in the through hole but releasing said twist upon complete insertion of the holding portion into the through hole.

5 Claims, 8 Drawing Figures

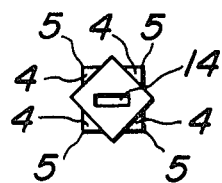
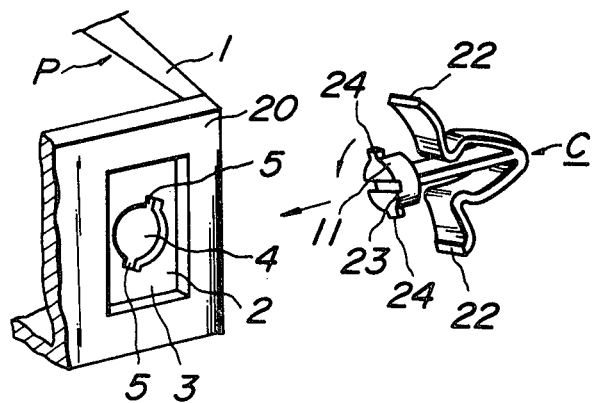
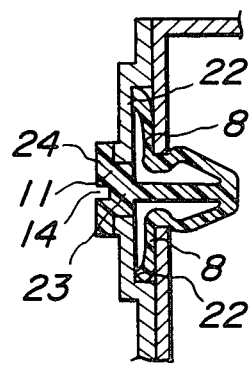
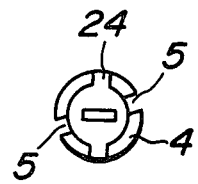

ELEMENT MOUNTING STRUCTURE

BACKGROUND OF THE INVENTION

1. Field of the Invention

This invention relates to an element mounting structure for mounting a constituent element of an article to a body of the article, especially body of a vehicle.

2. Description of the Prior Art

A typical structure of prior art for mounting an element of part onto a body will be described at first, by taking an example of mounting a radiator grille onto the front surface of an automobile body as illustrated in FIGS. 1 and 2. As shown in FIG. 1, a radiator grille P representing one of elements or parts constituting an automobile body has at least one mounting portion 1 for mounting the grille onto a radiator core support B of the automobile body, and an insert hole 17 is bored through the mounting portion 1 for facilitating insertion of the thread portion 16 of a tapping screw 15. On the other hand, the radiator core support B has a mounting portion 6 with a mounting hole 7 bored therethrough for fitting a screw grommet 18 on the hole 7, as shown in FIG. 2. The thread portion 16 of the tapping screw 15 inserted in the insert hole 17 is screwed into the screw grommet 18, for securely mounting the radiator grille P onto the radiator core support B.

With the aforesaid element mounting structure of the prior art, however, it is necessary beforehand to fit the screw grommet 18 onto the mounting hole 7 on the automobile body side, to butt the mounting portion 1 of the radiator grille P to the front surface of the mounting hole 7, to insert the tapping screw 15 through the insert hole 17 while aiming at the screw grommet 18, and to forcibly screw the tapping screw 15 into the screw grommet 18. As a result, the element mounting structure of the prior art has shortcomings in that a large number of working steps are required for the mounting work and the workability thereof is poor, and that a large number of elements or parts are necessary and expensive material or surface treatment is necessary for the tapping screw 15 for preventing rusts, so that the structure of the prior art has been costly.

An object of the present invention is to obviate the aforesaid shortcomings of the prior art technique and to provide an improved element mounting structure.

SUMMARY OF THE INVENTION

An element mounting structure according to the present invention uses a through hole with a guide formed on one of an element and a main body on which the element is to be mounted, a mounting hole formed on the other one of said element and said main body, and a clip adapted to connect said element to said main body. Said clip comprises a connecting rod made of elastic material, a holding portion provided at one end of said connecting rod, an engaging portion provided at opposite end of said connecting rod to said holding portion so as to fit in said mounting hole, and a base plate means extending from said engaging portion toward an intermediate portion of said connecting rod so as to face said holding portion while clipping peripheral wall around said through hole therebetween. The guide of the through hole serves to twist said connecting rod when said holding portion is being inserted across said through hole, but upon complete passage of the holding portion through the through hole, the twist of the connecting rod is released and the holding portion comes into a holding engagement with the peripheral wall of said through hole. With a preferred embodiment of the present invention, the engaging portion of the clip includes holding pieces and stepped portions both of which are made of resilient material and adapted to resiliently fit in the mounting hole for keeping the clip in position.

In an embodiment of the present invention, said through hole is of a rectangular shape and said holding portion of the clip is a parallelepiped head with a similar rectangular cross section to the shape of said through hole. The parallelepiped head is fixed to said connecting rod in such an angular relation that, the parallelepiped head can be inserted across the through hole while causing the elastic connecting rod to be twisted, and upon complete insertion of the head, the twist of the connecting rod is released so as to cause the head to turn, so that parallelepiped head comes into a staggered angular position with the rectangular through hole which position ensures the holding engagement between the peripheral wall of the through hole and the parallelepiped head. To remove the head from the through hole, the head can be turned by an outside means, such as a screw driver, until the parallelepiped head comes to an angular position where the head can move across the through hole.

In another embodiment of the present invention, the holding portion of the clip is a cylindrical head with a diametrically located radial bosses, while the through hole has such a circular shape with diametrically located notches that, if the cylindrical head is at a certain angular relationship with the through hole, the head can be inserted across the through hole while causing the elastic connecting rod to be twisted. The cylindrical head is, however, fixed to the elastic connecting rod in such an angular relationship that, upon complete passage of the cylindrical head through the through hole, the twist of the connecting rod is released and the cylindrical head is turned until the diametrically located bosses of the head come into the holding engagement with the peripheral wall of the through hole. When it is desired to remove the cylindrical head from the through hole, the cylindrical head can be angularly turned by a suitable means, such as a screw driver, until the bosses of the head are aligned with the notches of the through hole.

BRIEF DESCRIPTION OF THE DRAWING

For a better understanding of the present invention, reference is made to the accompanying drawing, in which:

FIG. 5 is an end view illustrating the relationship between a through hole and a holding portion of the element mounting structure under the mounted condition of FIG. 4;

FIG. 6 is a perspective view of another embodiment of a clip and a radiator grille mounting portion to be used in the element mounting structure of the present invention;

FIG. 7 is a partial sectional view illustrating the manner in which the radiator grille is mounted onto the mounting portion of the radiator core support by using the clip and the mounting portion of FIG. 6; and FIG. 8 is an end view illustrating the relationship between a through hole and a holding portion of the element mounting structure under the mounted condition of FIG. 7.

Figure 1:
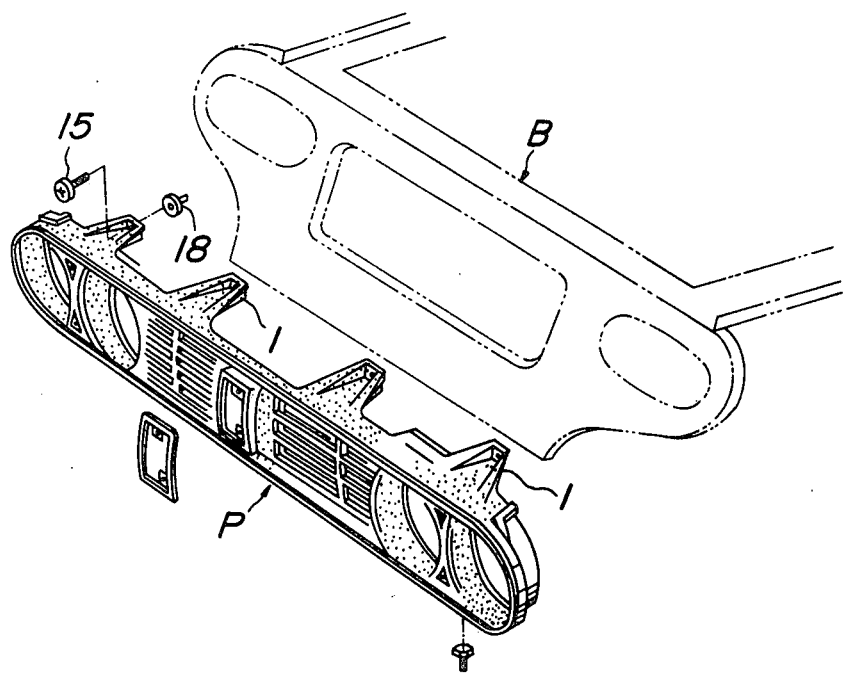
FIG. 1 is a perspective view of a radiator grille, as an element to be mounted on an automobile main body by a mounting structure of prior art.

Throughout the different views of the drawing, B is a main body, as represented by a radiator core support of an automobile; P is an element or a part to be mounted on the main body, as represented by a radiator grille; C is a clip; 1 is a mounting portion of the element side; 2 is a recessed portion; 3 is a bottom surface; 4 is a through hole; 5 is a guide; 6 is a mounting portion of the main body side; 7 is a mounting hole; 8 is a base plate; 10 is a connecting rod; 11 is a holding portion; 12 is an engaging portion; 13 is a screw driver; and 14 is a groove.

DESCRIPTION OF THE PREFERRED EMBODIMENTS

The present invention will now be described in further detail by referring to embodiments as illustrated in the attached drawing, which embodiments are applications of the present invention to the mounting of an element as represented by a radiator grille onto a main body as represented by a radiator core support of automobile.

Figure 3:
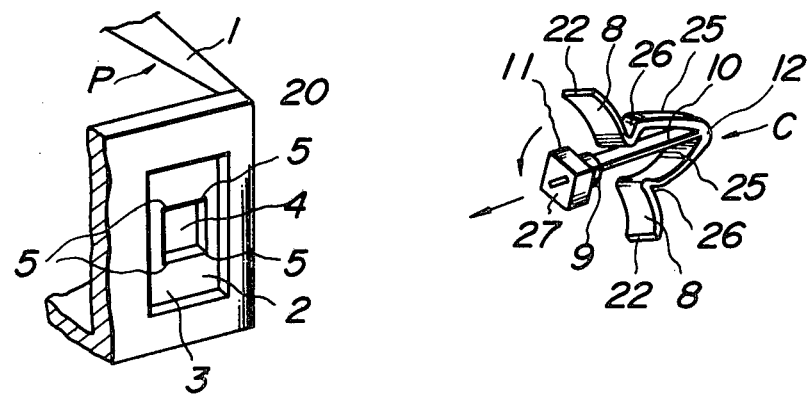
FIG. 3 is a perspective view of a clip to be used in an element mounting structure according to the present invention, as shown along with a mounting portion of the radiator grille with which the clip is to coact.
Figure 4:
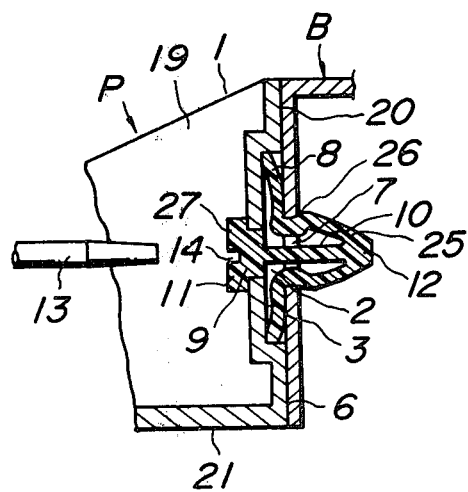
FIG. 4 is a partial sectional view illustrating the manner in which the radiator grille is mounted onto the mounting portion of the radiator core support by using the clip and the mounting portion of FIG. 3.

In the embodiment as shown in FIGS. 3 through 5, a radiator core support B on the main body side of an automobile has mounting portions 6 each having a rectangular mounting hole 7 bored thereon for mounting an element thereto, which element is a radiator grille P here.

The radiator grille P has the same number of mounting portions 1 as the aforesaid mounting portions 6 of the radiator core support B, which portions 1 are formed around the peripheral part of the grille P. As can be seen from FIG. 4, the mounting portion 1 has a pair of side walls 19, which are of right triangular shape in this embodiment, a rear wall 20 of substantially identical rectangular shape with the mating wall of the mounting portion 6 of the radiator core support B, and a bottom wall 21. The rear wall 20 of this embodiment has a rectangular recessed portion 2 at the central part on the rear surface thereof, and bottom surface 3 of the recessed portion 2 has a square through hole 4 bored therethrough.

Further referring to FIG. 4, a clip C for fastening the radiator grille P to the radiator core support B has a connecting rod 10, a holding portion 11 provided at one end of the connecting rod 10 and adapted to be held in the through hole 4 of the radiator grille P, and engaging portion 12 provided at the opposite end of the connecting rod 10 and adapted to fit in the mounting hole 7 of the radiator core support B, and a pair of base plates 8 formed by extending the tip ends of holding pieces 25 of the engaging portion 12 and adapted to fit in the recessed portion 2 formed on the rear wall 20 of the mounting portion 1 of the radiator grille P so as to clip the peripheral wall surrounding the through hole 4 by cooperation with the aforesaid holding portion 11. Each of the base plates 8 is provided with such warp that, when the base plate 8 is fitted in the recessed portion 2, an edge portion 22 of the base plate may come in contact with the bottom surface 3 at first for providing an elastic contact between the base plate 8 and the bottom surface 3. The holding portion 11 has a circular stud portion 9 with a diameter substantially equivalent to one side length of the square through hole 4 of the mounting portion 1 of the radiator grille P, and a rectangular parallelepiped portion 27 having a side length which is substantially the same as but not longer than that the side length of the square through hole 4 so as to allow the portion 27 to move through the hole 4, the side walls of the rectangular parallelepiped 27 being inclined by an angle of about 45° relative to the lateral width direction of the connecting rod 10. The circular stud portion 9 is located between the rectangular parallelepiped 27 and the connecting rod 10. The distance from the base plate 8 to the rectangular parallelepiped 27 can be somewhat longer than the wall thickness at the bottom of the recessed portion 2, and the holding portion 11 can be inserted into the through hole 4 and upon complete passage of the rectangular parallelepiped portion 27 across the through hole 4, the holding portion can be held by the peripheral wall surrounding the hole 4. Besides, the tip end surface of the holding portion 11 is provided with a groove 14 adapted to receive a minus-shaped screw drivet 13 or the like. The lateral width direction of the plate-like connecting rod 10 with a lateral width substantially equivalent to the diameter of the circular stud portion 9 of the holding portion 11 is kept in parallel to that of top and bottom edges of the base plate 8. It is noted that the engaging portion 12 is generally anchor-shaped with a pair of holding pieces 25 forming the base plates 8 at the tips thereof, and a pair of stepped portions 26 are provided at the boundaries between the holding pieces 25 and the end plates 8 which stepped portions are to be held by the edges of the mounting hole 7 bored at the mounting portion 6 of the radiator core support B. When being forced into the mounting hole 7, the engaging portion 12 will have the pair of the holding pieces 25 to be bent toward each other, and when the base plates 8 are brought into contact with the front surface of the mounting portion 6 of the radiator core support B, the stepped portions 26 are held by the edges of the mounting hole 7 by being engaged therewith.

Accordingly, with the element mounting structure of the aforesaid embodiment, to mount the radiator grille P to the radiator core support B, firstly the tip edges of the rectangular parallelepiped portion 27 of the clip C are aligned with guides 5 located at a part of the through hole 4, so as to force the holding portion 11 into the through hole 4 from the side of the recessed portion 2. The connecting rod 10 may be twisted by 45° to fit the base plates 8 into the recessed portion 2, and when the clip is forced in until the base plates 8 come into contact with the bottom surface 3 of the recessed portion 2, the rectangular parallelepiped 27 completely passes through the through hole 4, so that the twist of the connecting rod 10 is released and the holding portion 11 is held or stopped by the peripheral wall surrounding the through hole 4. Accordingly, the wall surrounding the through hole 4 is clipped by the holding portion 11 and the base plates 8. After the holding portion 11 of the clip C is fixed to the mounting portion 1 of the radiator grille P, the engaging portion 12 of the clip C is fitted into the mounting hole 7 of the radiator core support B, and when the stepped portions 26 of the holding pieces 25 are engaged with and held by the edges of the mounting hole 7, the radiator grille P is fixed to the radiator core support B. Here, the base plates 8 fitted in the recessed portion 2 are elastically in contact with the bottom surface 3, and the elastic force acting at the contact causes the holding portion 11 to come in tight contact with the peripheral wall around the through hole 4 and also prevents the clip C from retarding when the engaging portion 12 is forced into the mounting hole 7.

On the other hand, when it is desired to remove the radiator grille P from the radiator core support B, a minus-shaped screw driver 13 or a like driving means can be fitted in the groove 14 formed on the end surface of the holding portion 11, so as to twist the connecting rod 10 by the screw driver 13 or the like for aligning the corners of the rectangular parallelepiped portion 27 of the holding portion 11 with the guides 5 at the corners of the through hole 4. Then, if the radiator grille P is pulled away from the radiator core support B, the engagement between the peripheral wall of the through hole 4 and the holding portion 11 of the clip C is released, for allowing the removal of the radiator grille P.

It is noted here that, although the aforesaid embodiment uses a through hole 4 which is square, the cross section of such through hole 4 can be triangular, rectangular, pentagonal, or similarly polygonal. As regards the holding portion 11 of the clip C, the circular stud portion 9 may be dispensed with, and such portion 11 may be formed by extending the connecting rod 10 until being directly connected to the rectangular parallelepiped portion 27. The engaging portion 12 of the aforesaid embodiment including a pair of holding pieces 25 with the base plates 8 formed at the tip ends thereof, but the pair of holding pieces 25 may be replaced with one holding piece on the one side alone. Furthermore, in the aforesaid embodiment of the present invention, the radiator grille P is provided with a recessed portion 2 and the base plates 8 of the clip C are fitted into the recessed portion, but the recessed portion may be dispensed with and another suitable registering structure may be used for keeping the base plates 8 in position, or such registering structure may be completely dispensed with if it is allowed to do so.

FIGS. 6 through 8 illustrate another embodiment of the element mounting structure according to the present invention. The square through hole 4 bored through the mounting portion 1 in the first mentioned embodiment is modified into a circular through hole 4 in this embodiment, and the through hole 4 of this embodiment is provided with guide 5 made of a pair of notches formed at positions along the circumference of the circular hole. In the embodiment of FIGS. 6 through 8, the guides 5 are disposed at symmetric positions with each other with respect to the center of the circular hole, and a line connecting the guides 5 is inclined by about 45° relative to one side of a rectangular recessed portion 2. Besides, referring to FIG. 7, a clip C of this embodiment has a holding portion 11, which portion 11 comprises a cylindrical portion 23 fittingly slidable through the through hole 4 bored at the mounting portion 1 of the radiator grille P and a pair of bosses 24 extending from the circumferential surface of the tip end of the cylindrical portion 23 in a direction parallel to the line connecting side edges 22 of the base plates 8. The distance from the base plates 8 to those bosses 24 is somewhat longer than the distance from the bottom surface 3 of the recessed portion 2 to the opposite edge surface of the through hole 4, so that the holding portion 11 of the clip may be inserted into the through hole 4 after aligning the bosses 24 with the guides 5 while allowing the twisting of the connecting rod 10. When the bosses 24 of the holding portion 11 completely pass through the through hole 4, the twist of the connecting rod 10 is released and the bosses 24 of the holding portion 11 are engaged with or stopped by the peripheral wall surrounding the through hole 4. The tip end surface of the holding portion 11 is provided with a groove 14, and the lateral width of the connecting rod 10 is about the same as but not greater than the diameter of the through hole 4, while the engaging portion 12 is formed of a pair of holding pieces 25 having base plates 8 extended from the tip ends thereof, as in the case of the first mentioned embodiment.

Figure 2:
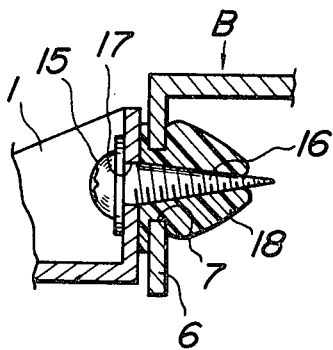
FIG. 2 is a sectional view of an element mounting structure of prior art as used for mounting the radiator grille of FIG. 1 onto the mounting portion of a radiator core support on the automobile main body side.

Thus, with the element mounting structure according to the present invention, which is formed in the aforesaid manner, what is necessary as a separate member of the structure for mounting an element or part P onto a main body B is a clip C alone, so that the number of constituent members of the mounting structure is reduced as compared with the prior art structure using a screw grommet and a tapping screw. The clip C itself can be easily manufactured by using synthetic resin, without necessitating any costly material or surface treatment for preventing corrosion or rust. In carrying out the actual mounting of an element P onto a main body B, it is possible to simultaneously effect the engagement of the holding portion 11 with the through hole 4 and the engagement of the engaging portion 12 with the mounting hole 7, by fitting the holding portion 11 of the clip C in the through hole 4 formed on one of the two mounting portions 1 and 6 placing the engaging portion 12 of the clip C in the mounting hole 7 formed on the other one of the two mounting portions. Therefore, in comparison with the prior art techniques for mounting an element on a main body as shown in FIG. 2, the element mounting structure according to the present invention has advantages in that the number of constituent members is small, that the clip C can be manufactured at a low cost, and that the work of mounting can be carried out in "one touch" or in a very simple manner with little expenses. Furthermore, the removal of an element P from a main body B can be easily effected by using a screw driver or the like.

In the foregoing embodiments, the case of mounting an automobile part radiator grille onto a radiator core on the automobile main body side is taken as examples, but the present invention can be applied to other cases, such as mounting other automobile parts onto the automobile main body or mounting an element onto a non-automobile main body. The clip C can be made of materials other than the synthetic resins, such as rubber and metal.

Although the present invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An element mounting structure comprising a body, and an element mounted onto the body, one of the body and the element having a through hole with a guide means; a mounting hole provided on the other one of the body and the element; and a clip having a resilient connecting rod, a holding portion formed at one end of the resilient connecting rod, an engaging portion formed at the opposite end of the connecting rod so as to be fitted in said mounting hole, and base plate means formed of an extension of said engaging portion to an intermediate portion of said connecting rod so as to clip peripheral wall surrounding said through hole by cooperation of said base plate means and said holding portion, whereby as the holding portion is inserted into said through hole by twisting the resilient connecting rod, while when the holding portion completely passes through the through hole, said twist of the connecting rod is released and the holding portion is held by the peripheral wall surrounding said through hole.

2. An element mounting structure as set forth in claim 1, wherein said clip further comprises a stepped portion formed between said base plate means and said engaging portion, so as to engage edges of said mounting hole.

3. An element mounting structure as set forth in claim 1, wherein said base plate means includes a pair of base plates.

4. An element mounting structure as set forth in claim 1, wherein said base plate means includes only one base plate.

5. An element mounting structure as set forth in claim 1, wherein said clip is made of a material selected from the group consisting of synthetic resin, rubber, and metal.

* * * * *